Sept. 5, 1950 G. H. MANUEL 2,521,590
POTATO CUTTER
Filed Jan. 31, 1947 2 Sheets-Sheet 1

INVENTOR.
G. H. MANUEL
BY
A. Yates Dowell
ATTORNEY

Sept. 5, 1950 G. H. MANUEL 2,521,590
POTATO CUTTER
Filed Jan. 31, 1947 2 Sheets-Sheet 2
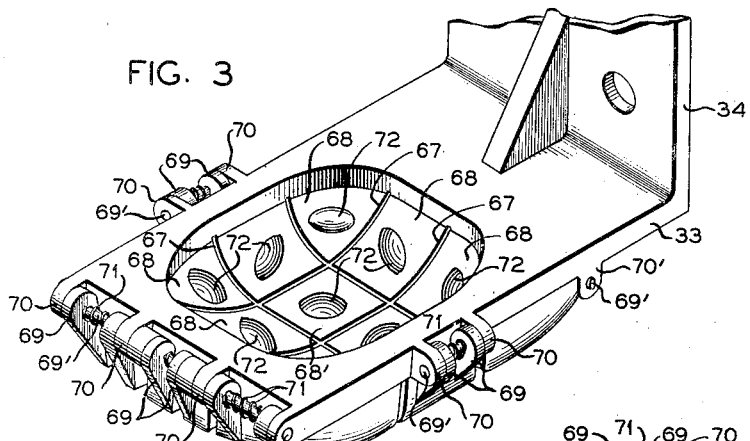
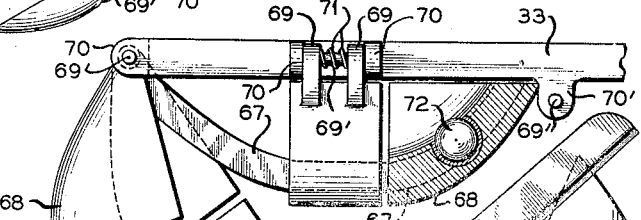
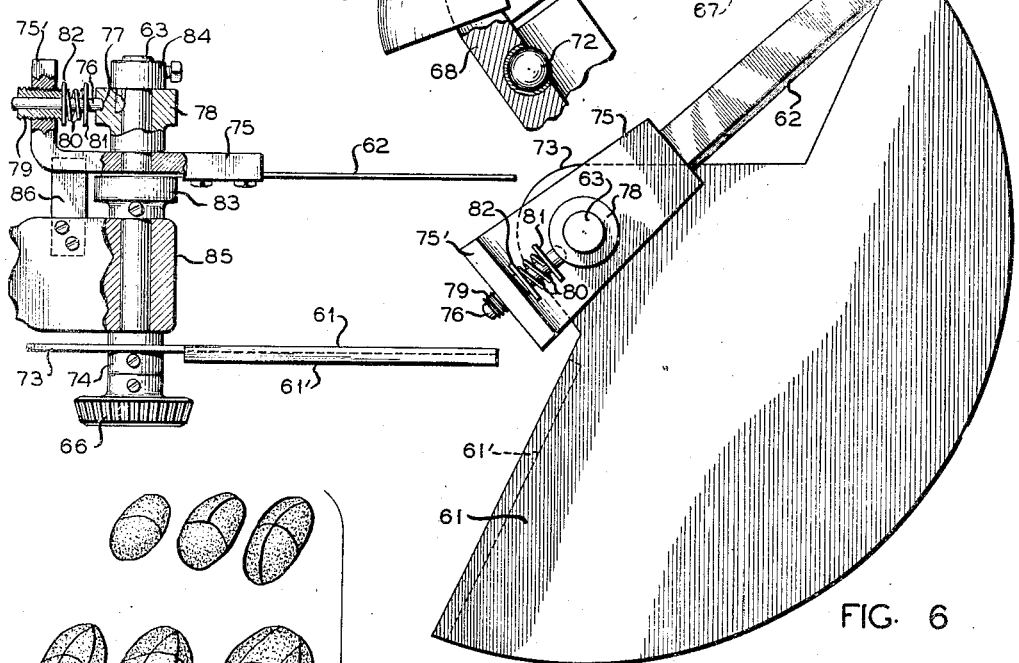
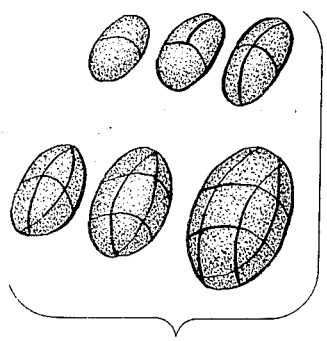
INVENTOR.
G. H. MANUEL
BY
A. Yates Dowell
ATTORNEY Patented Sept. 5, 1950

2,521,590

UNITED STATES PATENT OFFICE 2,521,590

POTATO CUTTER

Glenn H. Manuel, Washington, D. C., assignor of twenty-five per cent to George Ross Hull, Dauphin County, Pa.

Application January 31, 1947, Serial No. 725,523

9 Claims. (Cl. 146—78)

This invention relates to an improvement in mechanical implements and more particularly to an automatic implement of the character used in the potato industry. In its more narrow aspects, the invention will be described as comprising an apparatus and method for use in the grading and cutting of seed potatoes.

The potato industry is one of importance and requires the use of machinery for planting and harvesting. However, in the development of planting there appears to be no automatic mechanical apparatus for grading and cutting of what is known as field-run seed potatoes to a proper size and shape for handling by potato planters. There has been some attempt to provide mechanical machines for cutting potatoes, but the devices known to date do not cut the potato to a suitable size and shape for handling by potato planters while otherwise, if the cutting machine is hand operated, it requires individual handling and hand selection of each potato by the operator or cutter with the same result. In actual practice, it has been discovered that cutting the potato by hand operates as fast as the hand-operated potato cutting machine with much greater accuracy in the size and shape of seed cut. Furthermore, the seed cut by machines, of the nature heretofore discovered, are not as desirable as cuts made by hand, due to the fact that the potato, when it comes to rest in its cutting position, is not correctly placed with respect to potato-growing eyes and fails to provide a relatively uniformly shaped seed. Therefore, it has been found that an undue amount of wastage is present when any of the known or hand-operated potato seed cutters are used, resulting in a discarding of the device and a return to the prehistoric hand-operated knife.

Furthermore, it has been the practice in the planting of potatoes to employ and use hand labor for cutting seed potatoes several days in advance to planting, at which time, due to weather conditions, planting may be delayed thereby causing considerable loss by reason of spoilage of the seed. Also, of major consideration with the cost of material and hand labor there is the factor of the speed of mechanized development in planting and harvesting of potatoes offset by the crudeness of hand cutting seed potatoes.

It is therefore an object of this invention to provide an automatic implement particularly useful in the cutting of seed potatoes.

It is a further object of this invention to provide an automatic grading machine having a plurality of automatic cutters.

In addition, it is an object of this invention to provide an automatic mechanical grading and cutting machine for shaping seed potatoes suitable for use in mechanical planters.

It is a further object of this invention to provide a machine which automatically handles field run potatoes in preparation for planting by mechanical planting devices.

Further objects, uses, advantages and modifications of the invention will be apparent from the following description of the accompanying drawings, wherein like and corresponding parts will be similarly indicated:

Fig. 3, an isometric view of a nesting device;

Fig. 4, a modified side view of Fig. 3;

Fig. 5, a side plan view of a knife and holding plate arrangement;

Fig. 6, a top plan view of the knife and holding plate;

Fig. 7, a diagrammatic view figuratively illustrating a series of potato cuts as adapted to be made by this machine.

Figure 1:
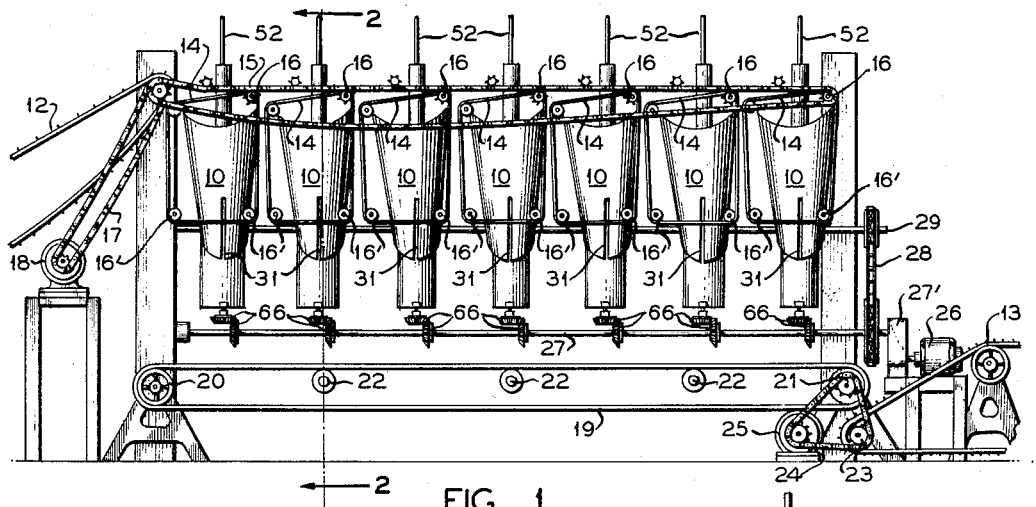
Fig. 1 is a diagrammatic rear view illustrating an arrangement of apparatus and drive means therefor.

Referring to the drawings, the view of Fig. 1 illustrates a series of hoppers 10 on the partially shown frame work 11 associated with a feeder belt 12 at one end and a discharge belt 13 at the opposite end. At the top of hoppers 10 there are a series of individual unitary grading screens 14 capable of being moved by chain 15 over the numerable rollers 16 and 16'. These rollers 16 are provided with conventional sprocket drive wheels operated by the chain 15, the roller 16 preferably being of rectangular shape where necessary due to the gauge of the screen as known to manufacturers and users of such screens. The chain 15 turning rollers 16 is driven by means of drive chain 17 from motor 18. This motor 18 likewise drives the feed belt arrangement 12, and altogether comprises mechanical features, including the feed belt, the parts of which are commercially available and may be assembled as shown. A feed hopper (not shown), or the like, is preferably used with feed belt 12.

The grading screens 14 are driven by the sprocketed rollers 16, as explained, and are individual in their operation as they rotate about a set of companionable rollers 16'. These rollers while similarly indicated by reason of their similarity of arrangement and operation are shown with the top roller 16' opposite the top companion roller 16 being placed at a slightly lower level in order to produce an incline to the screen and a tumbling effect to the article being fed on the screen, which produces thereby a more complete grading of an article according to its size. This grading of course being understood to be caused by the differences in grading screen sizes beginning with the smaller grade size adjacent feed belt 12 and the larger grade size being on the opposite end of the apparatus. These grading screens are of conventional design and may be purchased relative to size in accordance with the operator's wishes.

A conveyor belt 19 for conducting the finished product or cut seed onto a take-off conveyor belt 13 is disposed below the cutting mechanism this conveyor belt 19 being supported between conventional roller 20 and sprocketed drive roller 21 by free running rollers 22. The sprocketed wheel of roller 21 and sprocketed drive wheel 23, for conveyor belts 19 and 13, are driven by means of drive chain 24 from motor 25. It will be readily recognized that the motor 25 may be eliminated and replaced by suitable mechanical gearing and drive means from motor 26 or vice versa, for performing the operation required of motor 26, as later described.

The motor 26 is a power means for turning drive shaft 27 on suitable bearing supports through conventional reduction gearing 27' and drive chain 28, which likewise operates drive shaft 29 for controlling a component operation of the apparatus as hereinafter disclosed. As heretofore explained one motor means may be substituted for the two motors 25 and 26, and it will be a matter of mechanical expediency to use only one motor with appropriate gearing or drive chains to operate the conveyor belts 19 and 13 with shafts 27 and 29 at the proper speeds by using a ratio of gearing as hereinafter described.

Figure 2:
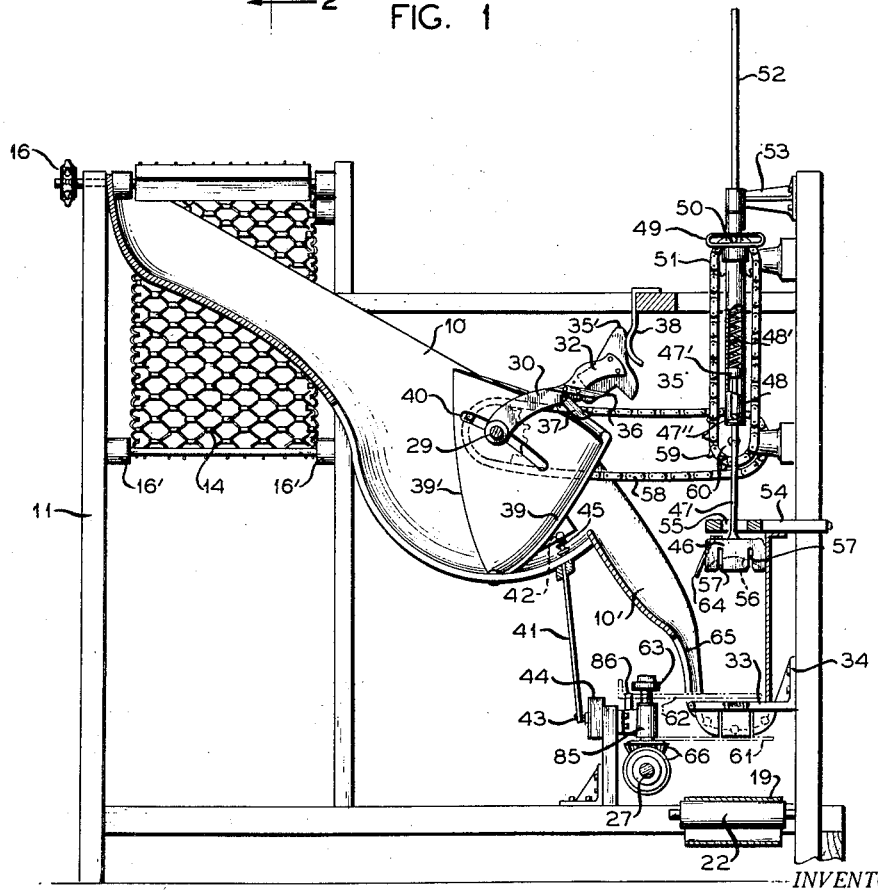
Fig. 2 is a cross sectional view of the line 2—2 of Fig. 1.

The disclosure of Fig. 2 illustrates in detail one unit of the apparatus and its component parts taken from the series of hoppers 10 shown in Fig. 1. This hopper 10 is fed by grading screen 14 from feed belt 12 in its normal operation and while it will be adapted to operate as a single unit, if desired, the preferred arrangement is the series.

In illustrating this unit and its operation with respect to cutting seed potatoes, it will be presumed that the motors 18, 25, and 26 are in operation conveying seed potatoes of varying size onto and over the screens 14 where, due to the first screen 14 being of smaller size, it alows seed potatoes that pass therethrough to drop into hopper 10 from which, by operation of shaft 29 the picker arm 30 is rotated in guideway 31 to cause the picker head 32 to pick up and carry a single potato from the hopper 10 and drop it into the potato cutting nest or basket 33 held by bracket 34. This potato picker arm 30 and picker head 32 are of a conventional design and are well known in the potato planting industry. Generally, the picker device operates by the blunted head 35 coming into contact with a potato as its back portion 35' follows guideway 31, forcing the potato onto point 36 while, at the same time, bracing the potato against backstop 37. As the arm 30 continues its forward movement, it brings the portion 35' against stopper 38, tripping the mechanism to loosen the clamped potato from point 36, allowing it to fall onto portion 10' of hopper 10 and slide into the potato basket 33. As illustrated, the hopper 10 is closed at its lower basin end by means of a movable catch wall 39 having sides 39'. The slot 40, in moveable side wall 39, is provided to permit the wall to slide past shaft 29 and, as shown in cross section, constitutes only one-half or one side of the wall portion, both sides of which are cooperative with guideway 31 to permit a free rotation of picker arm 30 and picker head 32.

The primary purpose of providing hopper 10 with a movable catch wall 39 is to more carefully control the feeding portion of the apparatus; this control being provided by a switch arm 41 offset from groove 31, and having one end 42 pivotably resting against the wall portion 39 and the opposite end 43 offset to avoid interference with the mechanical operation of the apparatus. This arm 41, attached to wall 39, thus controls the conventional electric switch 44, to turn off the motor 18 which drives the conveyor feed 12 and grading screens 14, whenever the feeding of potatoes to the hopper 10 becomes too rapid and fills the hopper 10 to capacity causing the lowering of wall 39 against the normally restraining pressure of spring 45. It will be obvious that spring 45, having its ends braced against movable wall 39 on one side and on the other side braced against the stationary abutment formed by hopper 10, normally tends to resist compression holding the walls 39 up and switch 44 closed until such time as excessive weight of the contents in hopper 10 will lower the walls 39 and open switch 44 to temporarily shut off the conveyance of potatoes to hoppers 10. One or more controls 39 may be used.

The mechanism for cutting a potato which has fallen from picker head 32 into potato basket 33 comprises a reciprocating plunger block 46, secured to rod 47. The rod 47 with plunger or piston-like head 47' is held at its upper end in hollow cylinder 48 against spring means 48' with a suitable slot and pin non-rotatable guideway means 47'' whereby the rod 47 may reciprocate without rotation within the cylinder during a cutting operation. By means of yoke arrangement 49 on the end of cylinder wall 48 the sylinder and its associated parts are coupled by pin 50 with a driving link of chain 51 and thereby reciprocated in an up and down or backward and forward like manner to complete a cutting action of the nature contemplated. A supporting end guide rod 52 serves to secure the rod 47, cylinder 48 and yoke 50 in alignment with guideways 53 and 54 the rod 52 being of rectangular shape or having suitable guideways to prevent rotation in support 53. Further, the support 54 with its enlarged opening 55 serves as a bearing guideway for cylinder wall 48 in its forward or downward motion on yoke 49 as chain 51 is turned.

The bearing guideway 55, for the wall of cylinder 48, also serves the purpose of acting as a support for rod 47 and block 46 during a cutting operation. The block 46 being designed to cooperate with circular knife blades, contained in basket 33, as hereinafter described, contains a hollowed-out center portion 56, as shown by the dotted line effect and grooves 57. The portion 56 is adapted to cooperatively engage and forcibly position a potato in the basket 33 and the grooves 57 allow the block member 46 to pass into the basket during a seed cutting operation. The drive means turning chain 51 to raise and lower cylinder 48 and reciprocate the plungers and its block 46 comprise a drive chain 58 driven from a suitable sprocket wheel on shaft 29. That is, turning of dual sprocket wheels 59 and 60 by drive chain 58 moves chain 51 about its course to raise and lower the yoke arrangement 49 which carries the cylinder 48 and its associated parts. In operation, when the yoke 49 has lowered the cylinder 48 carrying plunger block 46 into contact position with a potato held in basket 33, the plate 61 is in operative position, as hereinafter described, and serves to hold basket 33 closed, thereby causing compression of spring 48' by the continued lowering movement of the yoke arrangement 49 and cylinder 48. Associated with the holding means 61 is a knife 62 operating from a common shaft 63, for performing a horizontal or longitudinal cutting action, in a manner as hereinafter described.

Attached to the block 46 is a safety device comprising an elongated pin 64 which rides with the block in a downward motion through groove 65 in lower spout portion 10' of hopper 10. The purpose of this safety device is to prevent a horizontal slicing of a potato which falls into the basket when it is of too small a size to be sliced crosswise. That is, the safety device or pin 64 extends below the lower edge of block 46 to stop knife blade 62 when the block 46 engages a small potato in basket 33. The drive shaft 27, as more clearly illustrated in Fig. 1, operates gear wheels 66 to cause the rotation of holding plate 61 and knife 62 from the common drive shaft 63 mounted on a suitable obvious support.

The Fig. 3 illustrates, on holding bracket 34, one of the larger potato nests or baskets 33 adapted to cutting a large size potato and which comprises the cutting blades 67 rigidly secured to bracket member 34 and having their edges lying in a plane with or preferably just below the upper surface of blocks 68. The center block 68' is a continuation of one of the side blocks 68, as more clearly shown in Fig. 4. In order that the blocks may be freely forced out of their normal holding position, they are fastened by hinge members 69 at pivot points 70 along the outside and bottom edges of support member 34 with the springs 71 having sufficient tension to resist the weight and opening tendency of the blocks when a potato is contained in the basket.

Contained within the central portion of the blocks are ball bearings 72 which are freely rotatable in order by their movement, to allow the potato to come to rest centered or positioned in the central flattened portion of the basket 33 when pressure from block 46 (Fig. 2) is applied. Further, the bearings by their free rolling action, and the shape of the basket permit the potato to position itself, under the pressure of the block 46, proportionately over the cutting edges of the knife blades 67 and thereby is obtained a uniformly shaped cut seed potato. The construction of the hinge members 69 and 70 with retaining pins 69' and spring 71 are of conventional design.

Fig. 4 is an illustration of the manner in which the center block 68' is attached to one of the side blocks 68 and is operable therewith during a cutting operation. The bearing 72 is illustrated as positioned above the knife blade 67 beside the closed block 68, which block 68 is illustrated as positioned at a swivel point 70' under bracket 34 to operate in the same manner as the pivoting means heretofore described. It is to be noted that those blocks elsewhere positioned may be likewise fastened or that other pivotal means and arrangement may be provided.

Fig. 5 shows in detail a horizontal cutting instrument adapted to cooperate with the vertical knives contained in basket 33 for the cutting of seed potatoes of large size. The shaft 63 is driven by drive shaft 27 (shown in Fig. 1 and Fig. 2) through conventional gearing 66 and turns the plate member 61 under blocks 68 and 68' to retain them in a closed position during the time a potato is being positioned by pressure of the block 46 (Fig. 2) and also during the horizontal slicing operation, if used. This plate 61 has a downturned lip 61' at its face side to prevent a sharp edge being exposed to catch on the block members 68 (Fig. 5 and Fig. 6) in the event they are not in a tightly closed position. Supporting member 73, to which plate 61 is attached, is rigidly secured to collar or ring member 74 which, in turn, is bound by obvious screw means or other suitable means to shaft 63.

Near the top end of the shaft 63 is secured knife blade 62, of suitable cutting quality, fastened to arm 75 by suitable obvious bolt means, which arm 75, in turn, is free to rotate about shaft 63, when locking pin 76 is forced from its seat 77 in shaft collar member 78. The locking pin 76 is secured through the right angle piece 75' by a supporting hollow screw member 79, through which it also extends to permit a sliding movement of the pin upon compression of spring 80 wrapped about pin 76 between the stationary washer 81 and loose washer 82. Shaft collar member 78 is secured and supported on shaft 63 by a suitable obvious keyway and the collar members 83 and 84. In addition, there is provided on the support member 85 a flat spring 86, which serves to engage the rear portion of arm 75 adjacent the angular end 75' in its path of rotation about shaft 63 and its function is to be compressed or sprung under sufficient tension to cause a counter rotation of arm 75 carrying blade 62, when the knife blade stopping means 64 (Fig. 2) is in its path, thereby preventing continued rotation of the blade 62 and forcing the knife holding arm 75 to move back for a repositioning of pin means 76 in its seat 77 upon the continued rotation of shaft 63. The end of pin 76 which fits into seat 77 has a slightly curved surface to provide means for the pin 76 to move in and out of its holding position and the resistance of the pin holding spring 80 is sufficient to keep the knife blade 62 fast while cutting, but capable of being compressed when the knife blade stopping means 64 (Fig. 2) obstructs the knife blade path.

In Fig. 6 there is disclosed the plate member 61 with carrying lip 61' in its relationship with knife blade 62 and arm 75 upon their having completed a holding and cutting operation. The angular shape of the end of the plate member 61 opposite lip 61' is of particular construction to allow a simultaneous clearing of all block members 68 contained across the end or side width of the nest or basket 33. Inasmuch as during the time that any block 68 (Fig. 3) is being supported and held in its normally closed position by plate 61, the force exerted by the plunger 46 (Fig. 2) against a potato resting thereagainst in basket 33 (Fig. 2) will not push the potato into the knife blades 67 (Fig. 3).

Fig. 7 is an illustrative example of certain of the varying sizes of potatoes as they will be cut by the knives of the apparatus, and which corresponds to the grading scale and basket size. That is for the first hopper, adjacent feed belt 12 of Fig. 1, the cutting basket 33 is smaller and will contain one knife with its associated swinging block members to cut the potato in half according to its graded size as determined by the first screen 14 which may, for example, be of a 2½ inch diameter size. On the next screen 14 for the hopper 10, the grading size is slightly larger, for example, three inches in diameter size, and the corresponding basket 33 has the knife blades positioned to cut the potato into three sections of substantially equal size and shape.

The next screen 14 is relatively larger, for example, 3½ inch diameter size, and permits a potato of larger size to pass therethrough and thence from hopper 10 into the potato cutting basket or nest 33 (Fig. 2) wherein it is cut into quarter sizes substantially of block shape. In these cuts of the smaller potatoes, where the knife blade stopping means 64 (Fig. 2) will always descend to obstruct arm 75 (Fig. 2), the knife 62 (Fig. 5 and Fig. 6) and its connected parts may be omitted. Further, where small potatoes or other articles are to be cut, it may be desired that the plate itself be eliminated, as the plunger member 46 (Fig. 2) with its spring action serves to position the article on the bearings 72 used in receiving baskets 33 (Figs. 2, 3, and 4). Also it is to be understood that this plate or basket holding means 61 (Figs. 2, 5, and 6) is preferred to hold the basket blocks 68 (Figs. 3 and 4) in a closed position during an article positioning movement of the apparatus and, in fact, is a necessary part when objects such as potatoes are of irregular contour and may require some force to adjust themselves on bearing members 72 (Figs. 2 and 3).

The next larger size, for example, where a screen of four inch diameter size is used, the potato is larger and ofttimes needs slicing through substantially its center portion. In this case the plunger member 46 (Fig. 2) has operated to position the potato in the nest and by reason of the potato size prevents knife stopping member 64 from obstructing knife blade 62, thus allowing the blade to rotate on shaft 63 (Fig. 2 and Fig. 5) cutting the potato horizontally and substantially through its center length and plate 61 (Fig. 2, Fig. 5, and Fig. 6) having cleared, allows plunger block 46 (Fig. 2) to force the sliced potato through blades 67, which operate to cut it into block-like pieces of substantially equivalent size and shape suitable for use in potato planting machinery.

As the potatoes pass over subsequent screen members 14 in a grading operation, the balance of the units operate in the same manner as described to cut from the smallest to the largest potato a seed portion of the nature which may be used in mechanical planters; that is, of a substantially uniform size and shape.

In order to provide a better understanding of the apparatus and its working parts, a complete cycle of operation will be described by following the path of a potato from a screen member 14 to the take-off conveyor belt 13. Assuming that the motors are operating conveyor belts 12, 13, and 22 and grading screens 14, the hopper 10 will receive potatoes of a graded size. The picker head 32 will then make one revolution and the cylinder 48 will make one forward and one backward movement in timed relationship with the picker head so that, as illustrated, the picker head 32 is tripped at the time the cylinder 48 is at the peak of its backward motion. With the picker head 32 tripped, a potato will fall into nest or basket 33 as the cylinder 48 moves block 46 downward to rest on the potato and position it. During the cycle of the picker head 32 and the backward and forward motion of cylinder 48, the plate 61 will make two revolutions carrying knife blade 62 with it, when not obstructed or stopped by member 64. The cycle of the plate 61 is also in timed relation to the reciprocating action of the cylinder 48 so that just before the block 46 can apply pressure on the contents of the basket, the leading edge of plate 61 passes under the swinging basket bottom blocks 68, holding them in a closed position until knife blade 62 passes through the approximate center of the potato, if not stopped by member 64, and thereafter the plate clears the block members 68 so that block 46, which has meanwhile built up considerable pressure by compression of spring 48' on continued movement of cylinder 48, pushes the potato through stationary knives 67, offsetting the pressure of spring members 71 to open blocks 68, permitting the cut seed portion of the potato to fall on conveyor belt 19 from whence they are carried to conveyor belt 13 for removal and subsequent planting. During the return movement of the reciprocating plunger member 46 the blade 62 makes a complete revolution picking up the knife blade 62, in the event the holding arm 75 was obstructed by member 64 in its first turn. That is, the gear timing is on the ratio of 2–1–1 for the slicing and holding, cutting and picker operation.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A machine for cutting seed potatoes into substantially equal parts comprising a potato receiving basket, feeding means for depositing potatoes one at a time in said basket, a closure for the bottom of said basket comprising a plurality of hingedly mounted interfitting blocks, freely rotatable potato engaging means disposed in the upper surface of each block, resilient means for maintaining said blocks in closed position, lateral and longitudinally disposed cutting blades fixed in said basket between said blocks, a relatively narrow horizontally disposed rotatably mounted cutting knife having a path of movement adjacent and across the upper surface of said basket, means for rotating said knife, a vertical potato engaging plunger disposed above said basket, means operating in timed relation to said feeding means for resiliently urging said plunger downwardly into engagement with a potato disposed in said basket for positioning said potato on said potato engaging means and for holding said potato in position during the horizontal cutting operation of said knife, means associated with said knife and driven in timed relation thereto for maintaining said blocks in closed position during the cutting operation of said knife and for releasing said blocks immediately after completion thereof, whereby said plunger will force the horizontally cut potatoes through said basket, said blades producing a plurality of vertical cuts resulting in a plurality of potato parts of substantially equal size, said blocks being closed by said resilient means upon upward movement of said plunger.

2. A machine for cutting seed potatoes into a plurality of parts comprising a potato receiving basket, feeding means for depositing potatoes one at a time in said basket, closure means for the bottom of said basket comprising a plurality of hingedly mounted blocks, freely rotatable potato engaging means disposed in the upper surface of each block, resilient means for maintaining said blocks in closed position, lateral and longitudinally disposed cutting blades fixed in said basket, a relatively narrow horizontally disposed rotatably mounted cutting knife having a path of movement adjacent and across the upper surface of said basket, means for rotating said knife, a vertically movable potato engaging plunger disposed above said basket, means operating in timed relation to said feeding means for resiliently urging said plunger downwardly into engagement with a potato disposed in said basket for positioning said potato on said potato engaging means and holding said potato in position during the horizontal operation of said knife, means associated with said knife and driven in timed relation thereto for maintaining said blocks in closed position during the cutting operation of said knife and for releasing said blocks immediately after the completion thereof whereby said plunger will force the horizontally cut potatoes through said basket, said blades producing a plurality of vertical cuts resulting in a plurality of potato parts, said blocks being closed by said resilient means upon upward movement of said plunger.

3. A machine for cutting seed potatoes into a plurality of parts comprising a potato receiving basket, feeding means for depositing potatoes in said basket, closure means for the bottom of said basket comprising a plurality of hingedly mounted blocks, resilient means for maintaining said blocks in closed position, cutting blades fixed in said basket, a relatively narrow horizontally disposed rotatably mounted cutting knife having a path of movement adjacent and across the upper surface of said basket, means for rotating said knife, a vertically movable potato engaging plunger disposed above said basket, a common drive means for said feeding means and said plunger, resilient means connecting said drive means and said plunger whereby said plunger operates in timed relation to said feeding means and is resiliently urged downwardly into engagement with a potato disposed in said basket for holding said potato in position during a horizontal cutting operation of said knife, means mounted for rotation with said knife and engaging said blocks and for maintaining said blocks in closed position during the cutting operation of said knife and releasing said block immediately after completion thereof whereby said plunger will force the horizontally cut potato through said basket, said blades producing a plurality of vertical cuts resulting in a plurality of potato parts, said blocks being closed by said resilient means upon upward movement of said plunger.

4. A machine for cutting seed potatoes into a plurality of parts comprising a potato receiving basket, feeding means for depositing potatoes in said basket, closure means for the bottom of said basket, means for resiliently maintaining said closure means in closed position, a cutting blade fixed in said basket, a horizontally disposed cutting knife having a path of movement adjacent and across the upper surface of said basket, means for operating said knife, a vertically movable potato engaging plunger disposed above said basket, means operating in timed relation to said feeding means for resiliently urging said plunger downwardly into engagement with a potato disposed in said basket, means for holding said potato in position during the horizontal cutting operation of said knife, means for maintaining said closure means in closed position during the cutting operation of said knife and for permitting said closure means to open immediately after the completion thereof whereby said plunger will force the horizontally cut potatoes through said basket, said blades producing a plurality of vertical cuts resulting in a plurality of potato parts, said closure means being closed by said resilient means upon upward movement of said plunger.

5. A machine for cutting seed potatoes into a plurality of parts comprising a potato receiving basket, feeding means for depositing potatoes one at a time in said basket, closure means for the bottom of said basket comprising a plurality of hingedly mounted interfitting blocks, freely rotatable potato engaging means disposed in the upper surface of each block, resilient means for maintaining said blocks in closed position, lateral and longitudinally disposed cutting blades fixed in said basket between said blocks, a relatively narrow horizontally disposed rotatably mounted cutting knife having a path of movement adjacent and across the upper surface of said basket, means for rotating said knife, a vertically movable potato engaging plunger disposed above said basket, means operating in timed relation to said feeding means for resiliently urging said plunger downwardly into engagement with a potato disposed in said basket for positioning said potato on said potato engaging means, means on said plunger for engaging and interrupting the rotary movement of said knife when said plunger initially engages the potato below the upper surface of said basket whereby further downward movement of said plunger will force said potatoes through said basket, said blades producing a plurality of vertical cuts resulting in a plurality of potato parts, said blocks being closed by said resilient means upon upward movement of said plunger.

6. A machine for cutting seed potatoes into a plurality of parts comprising a potato receiving basket, feeding means for depositing potatoes in said basket, closure means for the bottom of said basket comprising a plurality of hingedly mounted blocks, resilient means for maintaining said blocks in closed position, cutting blades fixed in said basket, a horizontally disposed cutting knife having a path of movement adjacent and across the upper surface of said basket, means for operating said knife, a vertically movable potato engaging plunger disposed above said basket, means operating in timed relation to said feeding means for resiliently urging said plunger downwardly into engagement with a potato disposed in said basket, means on said plunger for engaging and interrupting the movement of said knife when said plunger initially engages a potato below the upper surface of said basket whereby further downward movement of said plunger will force the potato through said basket, said blades producing a plurality of vertical cuts resulting in a plurality of potato parts, said blocks being closed by said resilient means upon forward movement of said plunger.

7. A machine for cutting seed potatoes into a plurality of parts comprising a potato receiving basket, feeding means for depositing potatoes in said basket, closure means for the bottom of said basket comprising a plurality of hingedly mounted blocks, freely rotatable potato engaging means disposed in the upper surface of each block, resilient means for maintaining said blocks in closed position, cutting blades fixed in said basket, a vertically movable potato engaging plunger disposed above said basket, means operating in timed relation to said feeding means for resiliently urging said plunger downwardly into engagement with a potato disposed in said basket for positioning said potato on said potato engaging means and upon further downward movement of said plunger, for forcing the potato through said basket, said blades producing a plurality of vertical cuts resulting in a plurality of potato parts said blocks being closed by said resilient means upon upward movement of said plunger.

8. A machine as defined in claim 2 in which the freely rotatable potato engaging means comprises a ball rotatably disposed in a recess in each block with a portion of the ball projecting above the surface of each block.

9. A machine as defined in claim 5 in which means is provided for interrupting the drive of said horizontal knife upon engagement therewith by the means on said plunger and additional means for returning said knife to its initial position whereby the driving connection is reestablished.

GLENN H. MANUEL.

REFERENCES CITED

The following references are of record in the file of this patent:

UNITED STATES PATENTS

| Number | Name | Date |
|---|---|---|
| 573,551 | Sternberg | Dec. 22, 1896 |
| 1,058,821 | Welker et al. | Apr. 15, 1913 |
| 1,337,968 | Schroeder | Apr. 20, 1920 |
| 1,347,058 | Schroeder | July 20, 1920 |
| 1,438,922 | Knutson | Dec. 12, 1922 |
| 1,794,833 | Castellucci | Mar. 3, 1931 |
| 1,961,009 | Nachtigal | May 29, 1934 |
| 2,017,559 | Wolfinger | Oct. 15, 1935 |